(12) United States Patent
Chen (10) Patent No.: US 8,680,981 B2
(45) Date of Patent: Mar. 25, 2014

(54) TIRE PRESSURE DISPLAY DEVICE AND ITS DETECTION METHOD

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 259 days.

(21) Appl. No.: 13/314,096

(22) Filed: Dec. 7, 2011

(65) Prior Publication Data

US 2013/0147618 A1 Jun. 13, 2013

(51) Int. Cl.
*B60C 23/00* (2006.01)

(52) U.S. Cl.
USPC ............ 340/447; 340/442; 340/445; 73/146; 73/146.5; 116/34 R (58) Field of Classification Search
USPC ........... 340/442–448, 449, 10.1, 10.6, 425.5, 340/426.3; 73/146, 146.2–146.5; 701/1, 2; 116/34 R, 34 A, 34 B; 152/151, 152.1, 152/415

See application file for complete search history.

(56) References Cited

U.S. PATENT DOCUMENTS

| 6,034,595 A * | 3/2000 | Yanase | 340/444 |
| 6,215,389 B1 * | 4/2001 | Schmidt | 340/5.1 |
| 7,259,663 B2 * | 8/2007 | Ogawa | 340/442 |

* cited by examiner

*Primary Examiner* — Anh V La
(74) *Attorney, Agent, or Firm* — Guice Patents PLLC (57) ABSTRACT

The present invention is related to a tire pressure display device and its detection method. The tire pressure display device includes a main module, multiple tire pressure detection modules and a vehicle audio module, wherein the main module includes a CPU and a receiver. By the composition of the above elements and the detection method, the tire pressure display device may actively report the location and tire pressure of tires during pumping up, synchronously execute broadcasting with image and voice, and directly correct errors and detect if the tire pressure detection module is break down for warning.

12 Claims, 7 Drawing Sheets

TIRE PRESSURE DISPLAY DEVICE AND ITS DETECTION METHOD

BACKGROUND OF THE INVENTION

1. Field of the Invention

A tire pressure display device and its detection method, which may report tire messages via the vehicle audio module, to actively report the location and tire pressure of tires during pumping up, synchronously execute broadcasting with image and voice, and directly correct errors and detect if the tire pressure detection module is break down for warning

2. Brief Description of the Related Art

Figure 1:
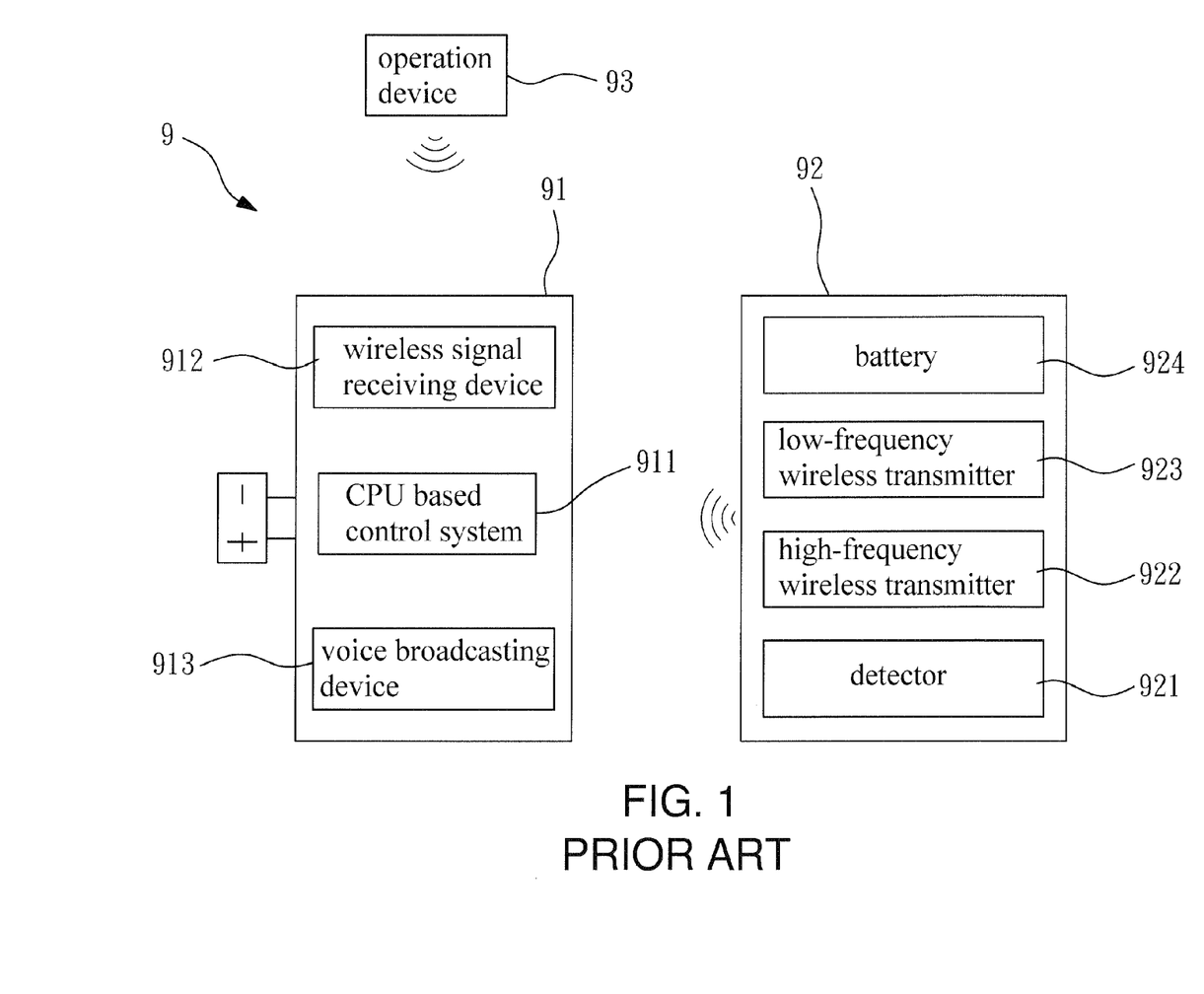
FIG. 1 is a block diagram of a conventional tire detection apparatus.

The tire pressure of tires in a vehicle are normal or not may be associated with traffic safety, so all of the vehicle manufacturers list the tire pressure displays or devices as one option of important driving equipments. However, the pairing method used in the existing tire pressure displays or devices are different, some are complicated and some are simple. Anyway, the mechanics exchanging tires are difficult to know all kinds of the pairing method and may not do the pairing work well, but the display of tire pressure may be error if the pairing work did not done well when exchanging tires. Otherwise, the tire pressure is displayed via the screen inside the vehicle. Although it can achieve the purpose of warning drivers when the tire pressure is abnormal, it can not be pressure reference for pumping up tires, and it is general condition in the existing tire pressure displays or devices. As shown in FIG. 1, it is a disclosed tire detection apparatus (patent number: US 2011/0205046A1, TW 201127661). The tire detection apparatus 9 includes a host device 91, a tire detection module 92 and an operation device 93. A CPU based control system 911, a wireless signal receiving device 912 and a voice broadcasting device 913 are set inside the host device 91. A detector 921, a high-frequency wireless transmitter 922, a low-frequency wireless transmitter 923 and a battery 924 are set inside the tire detection module 92, which may broadcast the tire detection result in the way of voice via the voice broadcasting device 913 of the host device 91. And an operation device 93 is set for operating anytime. Through the operation by the operation device 93, the voice broadcasting device 913 of the host device 91 may broadcast the tire detection results anytime. Also, by the compulsive broadcasting mechanism, the condition that users mistake the detection result is normal when the tire detection apparatus is breakdown may be avoid to affect traffic safety. Besides, the compulsive broadcasting mechanism of the tire detection apparatus 9 may be started ontime or by drivers, and there is a significant defect that may cause latent danger, namely, users cannot know tire pressure timely during pumping up tires and may know that tire pressure is not enough through the tire detection apparatus 9, or drivers do not turn on the tire detection apparatus 9.

SUMMARY OF THE INVENTION

In view of this, the inventor develops the tire pressure display device and its detection method of the present invention, namely, the object of the invention is to provide a tire pressure display device and its detection method for actively reporting the location and tire pressure of tires during pumping up, synchronously executing broadcasting with image and voice, and directly correcting errors and detecting if the tire pressure detection module is break down for warning. The feature of the present invention is that the vehicle audio module may actively display during pumping up tires, and broadcast the location and tire pressure of tires in the way of voice via at least one speaker. In this way, the detection result may be the reference for the pressure value when pumping up tires, and also may remind users whether correct pairing or not. And, once when finding out the broadcasted tire location is wrong or the tire is an unknown tire, users may directly press the modify key on the screen of the vehicle audio module for modification. The present invention also solves the defects of the conventional tire detection apparatus that tire location cannot be broadcasted simultaneously and the error cannot be corrected directly on the screen when the message is wrong.

To achieve the object, the tire pressure display device according to the present invention includes a main module, multiple tire pressure detection modules and a vehicle audio module, wherein:

the multiple tire pressure detection modules are provided for detecting tire pressure and reporting detection messages of tire pressure and tire location, the detection messages are integer signals of tire pressure and tire location;

the main module, which includes a CPU and a receiver; the receiver is connected to the CPU for receiving the reported detection messages of the multiple tire pressure detection modules; the CPU is connected to the receiver and used to process the received detection messages reported by the multiple detection modules for corresponding outputting;

the vehicle audio module, which is connected to the CPU, is provided to transform the detection messages reported by the multiple receivers to generate an image message for displaying via a screen, and transform the detection messages reported by the multiple receivers to generate a voice message for broadcasting via a speaker;

By the composition of the above elements and the detection method, the tire pressure display device may actively report the location and tire pressure of tires during pumping up. The vehicle audio module may voice broadcast tire pressure and tire location, and users may directly correct on the screen of the vehicle audio module if the tire location is error or the tire is unknown; users may know when the tire pressure detection module is break down if there is no report, so it can achieve the effect of reminding.

The tire pressure detection module further includes a wireless transmitter, which wirelessly sends the detection messages to the main module.

The receiver is a wireless receiver for receiving detection messages reported by the tire pressure detection modules.

The tire pressure detection module further includes a thermal detector for detecting the temperature of tires.

The receiver is further connected to an ACC power source for receiving a close signal from the ACC power source, and the CPU closes the main module for arriving a setup time after receiving the close signal of the ACC power source.

The vehicle audio module is further connected to a vehicle door open detection device for detecting the vehicle door open status. When the vehicle door open detection device detects that the vehicle door open status continues over a setup time, the location of the pressure rising tire is automatically changed to the relative location of the open vehicle door.

The tire pressure detection method of the present invention is using a tire pressure display device to detect and report messages and notify users the detection results by image and voice broadcasting; the tire pressure display device includes a main module, multiple tire pressure detection modules and a vehicle audio module, and the detection method of the tire pressure display device includes the following steps:

A. The tire pressure detection module detects tire pressure, and sends the detection message of tire pressure and tire location when detecting tire pressure varying, enter step B;

B. The main module determines the detection message, the receiver receives the detection message of the tire pressure detection module and determines the increasing speed of tire pressure, if the increasing speed of tire pressure is smaller than a setup value, the tire pressure may be increased because of the increasing temperature and the main module does not send the detection message of the tire pressure detection module, enter step A; if the increasing speed of tire pressure is larger than the setup value, the main module sends the detection message of the tire pressure detection module, enter step C;

C. The vehicle audio module transforms the detection message, receives the tire pressure detection message sent by the main module, and transforms the detection message reported by the multiple receivers to generate an image message and a voice message, enter step D;

D. The vehicle audio module broadcasts the detection message, the voice message of tire pressure and tire location is broadcasted via the speaker of the vehicle audio module, the image message of tire pressure and tire location is displayed on the screen of the vehicle audio module; if it is a tire pressure abnormal message, the tire pressure detection device emits warning sound to warn users, if tire location is wrong or unknown tire, the modify key of the vehicle audio module is provided for directly pressing to modify or input.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE PREFFERED EMBODIMENTS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 2:
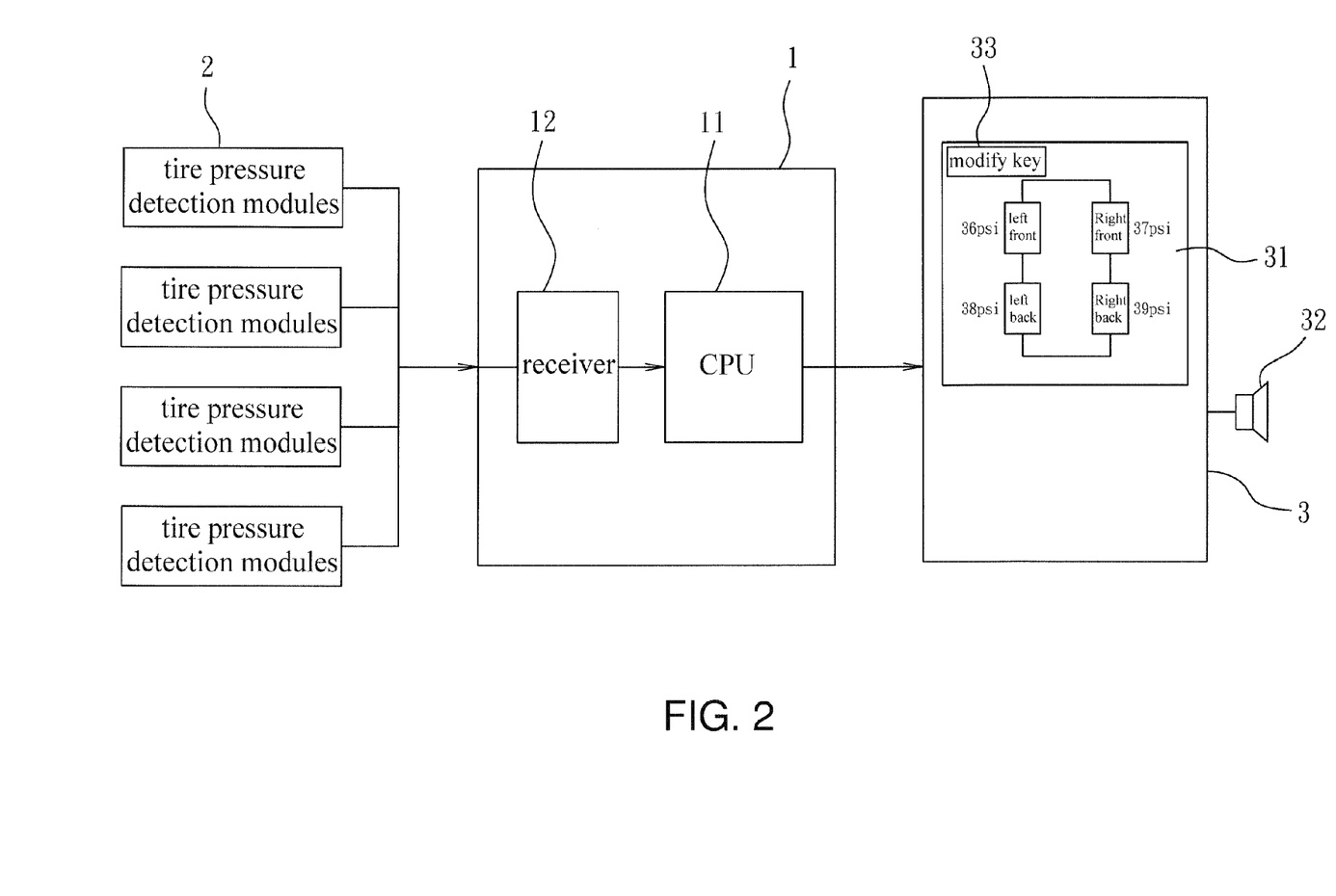
FIG. 2 is a block diagram of the first embodiment of the present invention.

The first embodiment of the present invention, as shown in FIG. 2, includes a main module 1, multiple tire pressure detection modules 2 and a vehicle audio module 3, wherein:

the multiple tire pressure detection modules 2, which detect tire pressure and report detection messages of tire pressure and tire location, the detection messages are integer signals of tire pressure and tire location;

the main module 1, which includes a CPU 11 and a receiver 12, the main module, which includes a CPU and a receiver; the receiver 12 is connected to the CPU 11 for receiving the detection messages reported by the multiple tire pressure detection modules 2; the CPU 11 is connected to the receiver 12 and used to process the received detection messages reported by the multiple detection modules 2 for corresponding outputting;

the vehicle audio module 3, which is connected to the CPU 11, the vehicle audio module 3 transforms the detection messages reported by the multiple detection modules 2 to generate an image message for displaying via a screen 31, and transform the detection messages reported by the multiple detection modules 2 to generate a voice message for broadcasting via at least a speaker 32;

By the composition of the above elements, the tire pressure detection module 2 may actively report tire location and tire pressure during pumping up tires. The vehicle audio module 3 may voice broadcast tire pressure and tire location. User may directly correct errors on the screen of the vehicle audio module if tire location is wrong or unknown tire; if there is no report, users may know the breakdown of the tire pressure detection module for warning. If tire location is wrong or unknown, for example, during pumping up the right front tire, the tire pressure detection module 2 reports tire pressure of the right back tire, users may directly press the screen 31 of the vehicle audio module 3 to correct. If there is no report, users may also know breakdown of the tire pressure detection module 2, so it can achieve the effect of warning users.

The screen 31 includes a modify key 33, users may press the modify key 33 on the screen 31 to correct errors, press the wrong tire on the screen 31, and move to the correct tire to switch location of the two tires to correct error. For example, users pump up the right front tire of the vehicle, but the tire pressure detection module 2 reports the right back tire and its tire pressure; users may press the right back tire on the screen 31, and move the right back tire to the right front tire for switching the two tires.

Figure 3:
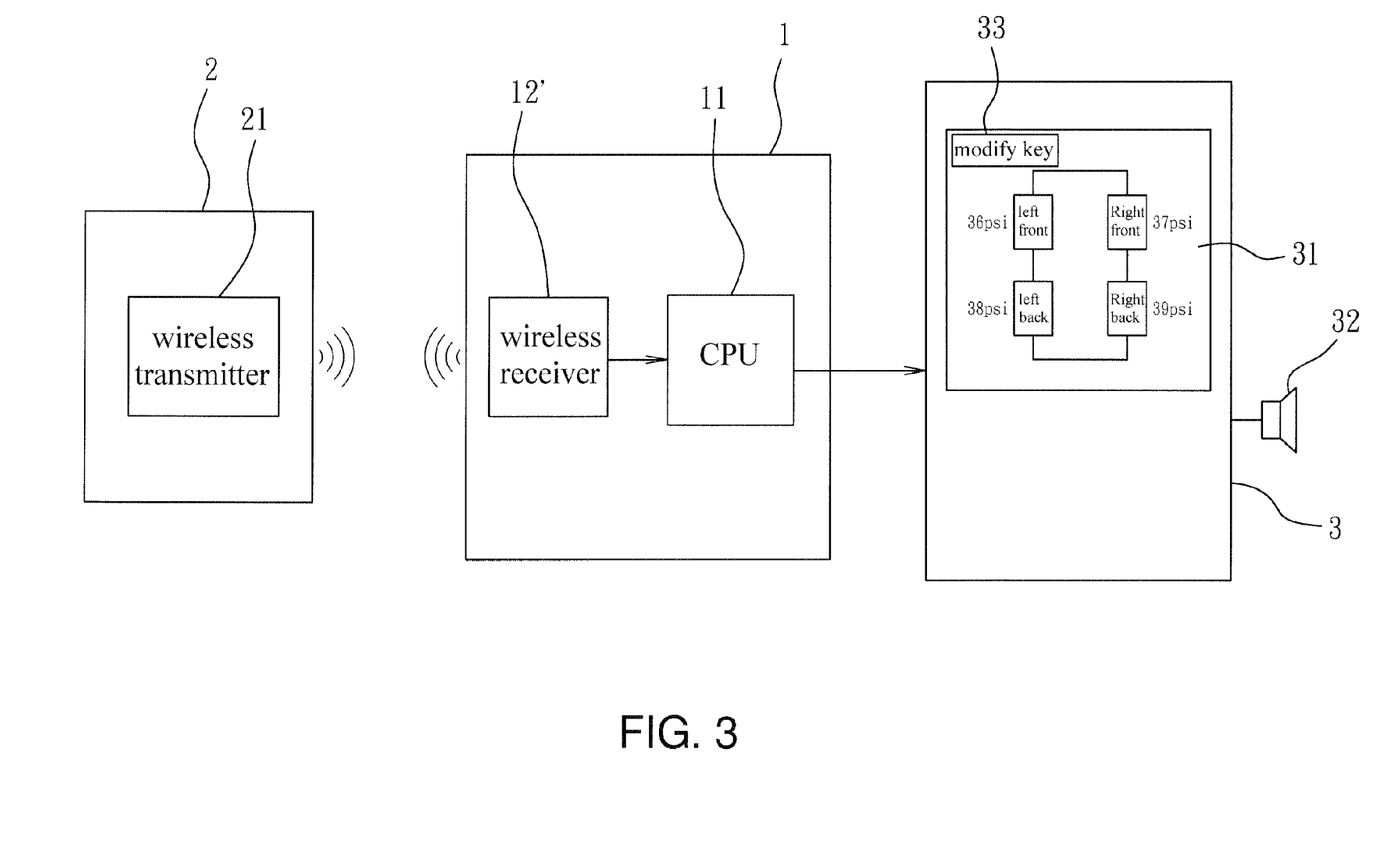
FIG. 3 is a block diagram of the second embodiment of the present invention.

The second embodiment of the present invention is shown in FIG. 3, the tire pressure detection module 2 further includes a wireless transmitter 21, which wirelessly sends the detection messages to the main module 1. In order to receive the detection message, the receiver is a wireless receiver 12'. The wireless receiver 12' is used to receive the detection messages of the multiple tire pressure detection modules 2 transmitted by the wireless transmitter 21.

Figure 4:
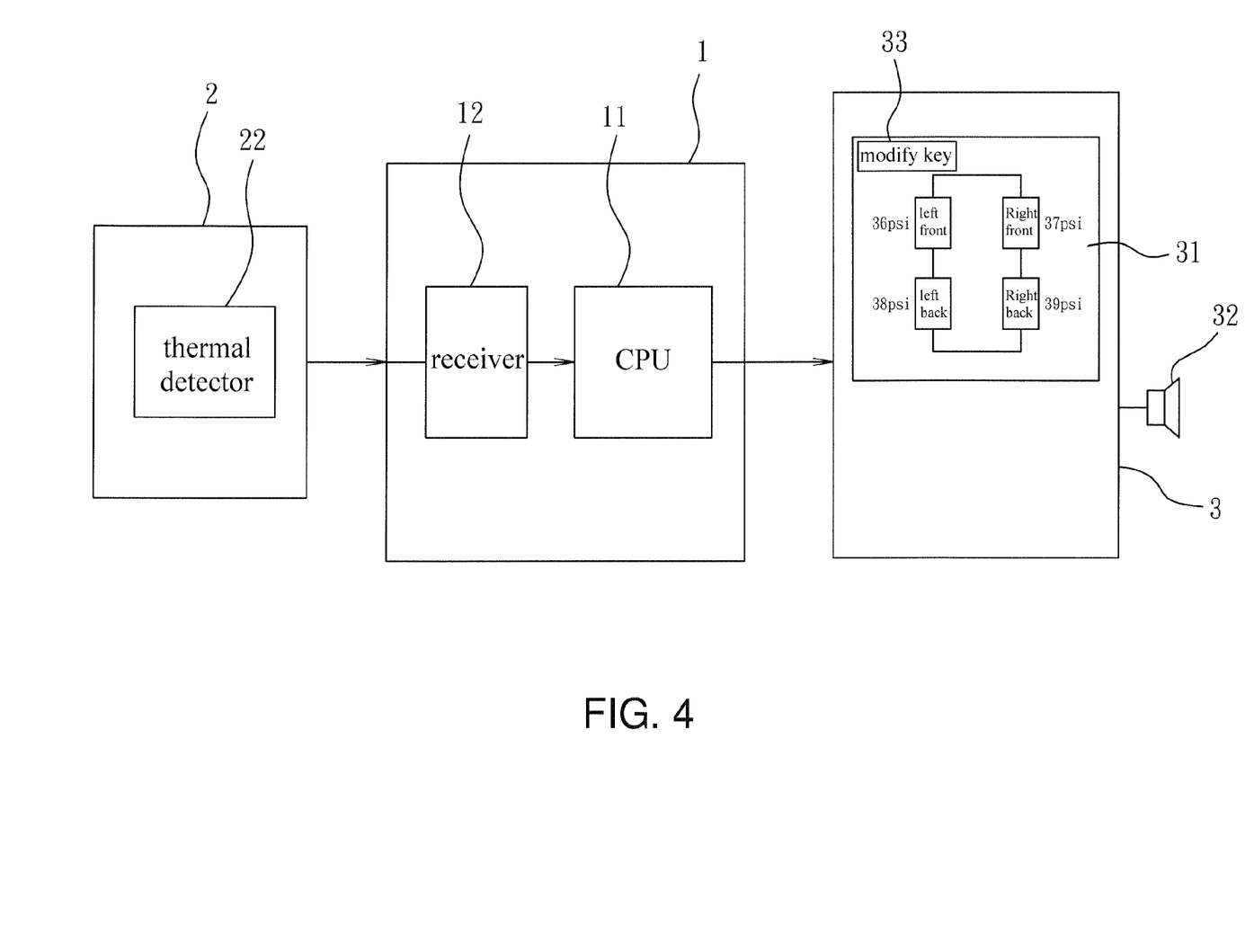
FIG. 4 is a block diagram of the third embodiment of the present invention.

Besides, the variation of tire temperature may affect traffic safety. Therefore, the third embodiment of the present invention (as shown in FIG. 4), the tire pressure detection module 2 further includes a thermal detector 22, which is used to transmit the detected temperature value of tires to the main module 1, to thereby control temperature of tires.

Figure 5:
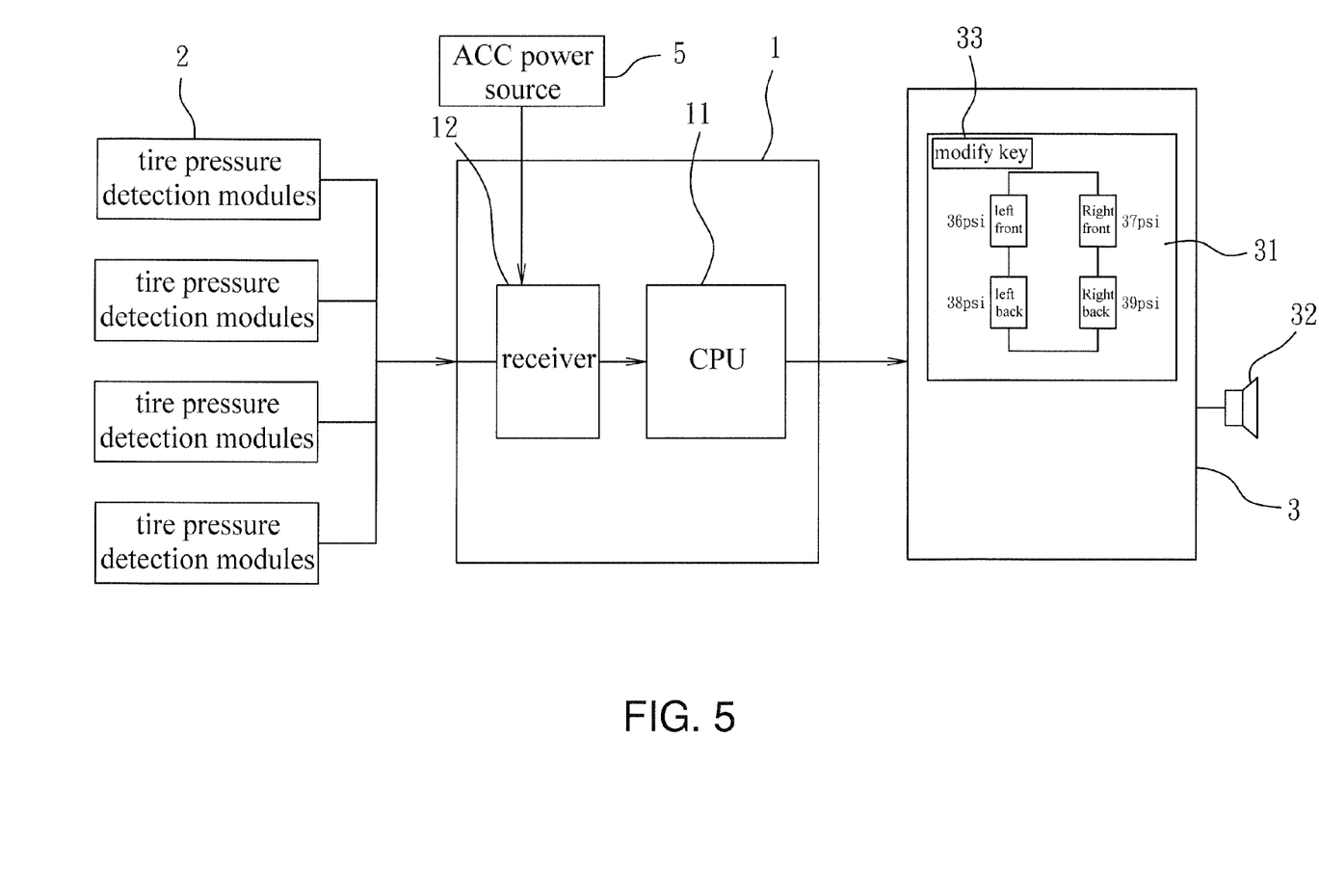
FIG. 5 is a block diagram of the fourth embodiment of the present invention.

The fourth embodiment of the present invention is shown in FIG. 5, the receiver 12 is connected to an ACC power source 5 for receiving the close signal (ACC off) of the ACC power source 5, and the CPU 11 closes the main module 1 for arriving a setup time (about 30 minutes) after receiving the close signal of the ACC power source 5. Generally, the electrical device in the vehicle may be closed during ACC off status for saving battery power, so does the tire pressure display device. However, during pumping up tires, the vehicle is generally in ACC off status, and the tire pressure display device can not detect tire pressure rising if it is closed. In the present invention, the main module 1 is set to be closed for arriving a predetermined time after the engine closed (ACC off). And after closing the engine (ACC off), once when pumping up tires, the receiver 12 receives the detection message from the tire pressure detection module 2; the CPU 11 sends a start message; the vehicle audio module 3 is started from the POWER OFF status as receiving the start message;

and the display of the screen 31 is switched to the tire pressure display. The vehicle audio module 3 transforms the detection messages reported by the multiple detection modules 2 to generate a voice message for broadcasting via the speaker 32 (namely, broadcasting tire pressure and tire location), and also transforms the detection messages reported by the multiple detection modules 2 to generate an image message for displaying tire pressure and tire location on the screen 31. If tire location is wrong or unknown, for example, during pumping up the right front tire, the tire pressure detection module 2 reports tire pressure of the right back tire. Users may directly press the screen 31 of the vehicle audio module 3 or press the modify key 33 to correct, press the right back tire on the screen 31, and then move the right back tire to the right front tire for switching the two tires to correct tire location. Users may also know breakdown of the tire pressure detection module 2, so it can achieve the effect of warning users.

Figure 6:
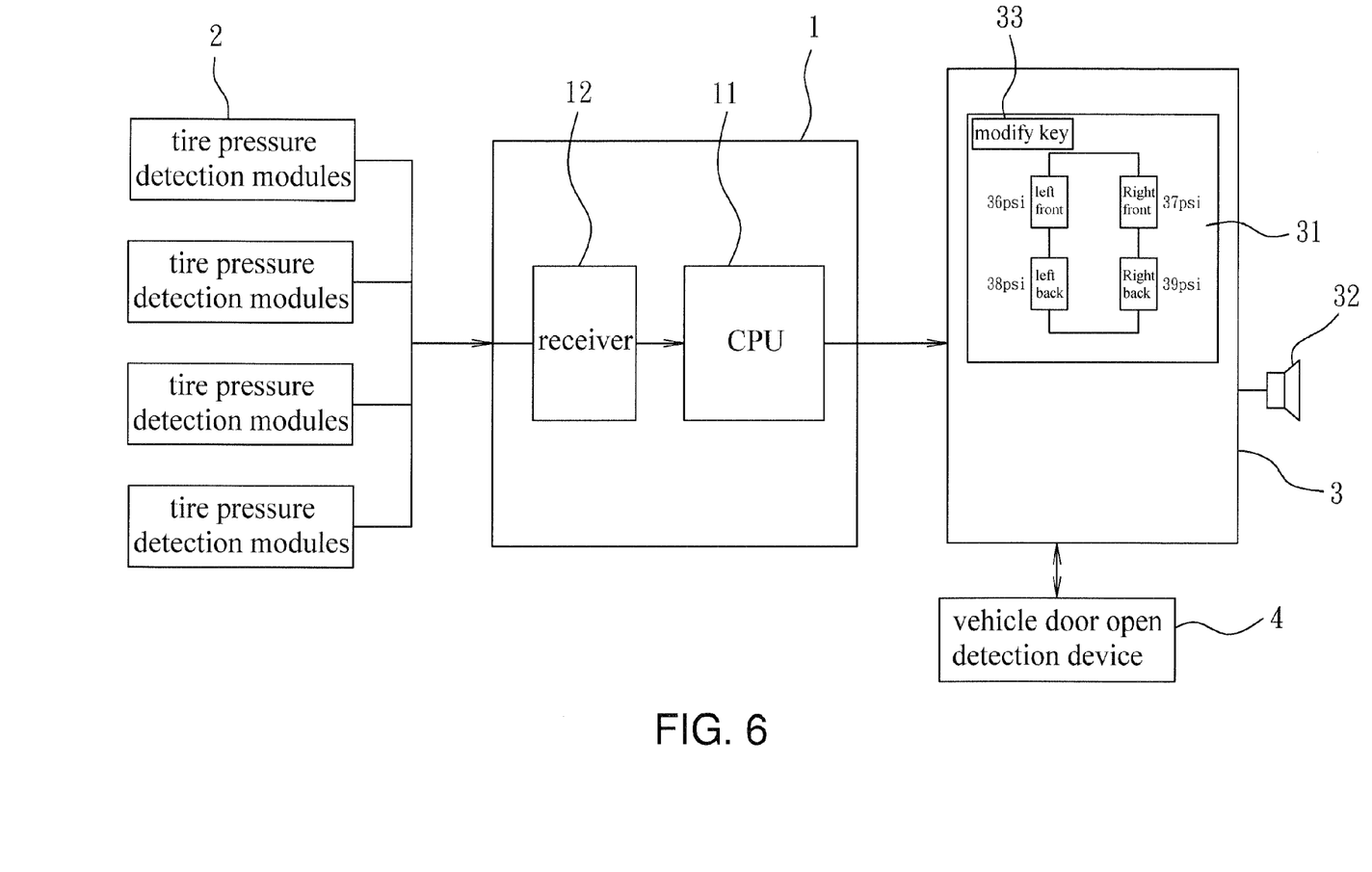
FIG. 6 is a block diagram of the fifth embodiment of the present invention.

The fifth embodiment of the present invention is shown in FIG. 6, the vehicle audio module 3 is further connected to a vehicle door open detection device 4. During pumping up tires, users may open the door near the tire to listen clearly the tire pressure message voice broadcasted by the vehicle audio module, to thereby help to pump up to an accurate tire pressure. It also can help the tire pressure display device to identify the location the current pressure rising tire and automatically modify tire location stored in the system, to thereby achieve the effect that the tire location is not necessary to be reset when exchanging tires. Because the setting method of tire location in each kind of tire pressure display devices is different, there is no uniform way. Usually, the mechanics exchanging tires are not familiar to electrical devices and difficult to set tire location accurately, so that the tire pressure display devices cannot provide correct tire location when warning during the tire is abnormal. The door open detection module 4 is used to detect door open status. When the vehicle door open detection device 4 detects that the vehicle door open status continues over a setup time (such as 5 seconds), the location of the pressure rising tire is automatically changed to the relative location of the open vehicle door. This is because the broadcasting voice of tire pressure comes from the vehicle audio module 3, broadcasting from the speaker 32 of the vehicle audio module 3. Users can not hear the voice when vehicle door is closed and may open the nearest vehicle door, so the opened door is related to the pumping-up tire. For example, during reporting tire pressure of the left back tire is rising, the right front door opens over the setup time, the left back tire is automatically change to the right front tire and the tire pressure display device starts to report tire pressure of the right front tire is rising.

Figure 7:
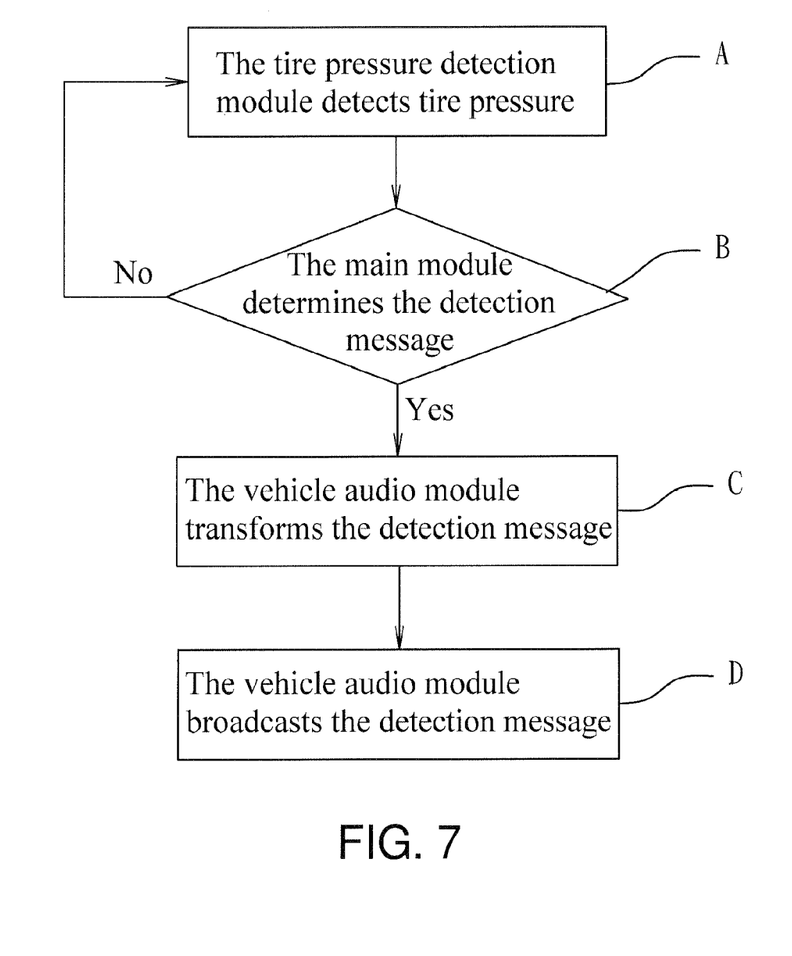
FIG. 7 is a flow chart of the detection method of the present invention.

As shown in FIG. 7, the tire pressure detection method of the present invention is using a tire pressure display device to detect and report messages and notify users the detection results by image and voice broadcasting. The tire pressure display device includes a main module 1, multiple tire pressure detection modules 2 and a vehicle audio module 3, and the detection method of the tire pressure display device includes the following steps:

A. The tire pressure detection module 2 detects tire pressure, and sends the detection message of tire pressure and tire location when detecting tire pressure varying, enter step B;

B. The main module 1 determines the detection message, the receiver 12 receives the detection message of the tire pressure detection module 2 and determines the increasing speed of tire pressure, if the increasing speed of tire pressure is smaller than a setup value, the tire pressure may be increased because of the increasing temperature and the main module 1 does not send the detection message of the tire pressure detection module 2, enter step A; if the increasing speed of tire pressure is larger than the setup value, the main module 1 sends the detection message of the tire pressure detection module 2, enter step C;

C. The vehicle audio module 3 transforms the detection message, receives the tire pressure detection message sent by the main module 1, and transforms the detection message reported by the multiple tire pressure detection devices 2 to generate an image message and a voice message, enter step D;

D. The vehicle audio module 3 broadcasts the detection message, the voice message of tire pressure and tire location is broadcasted via the speaker 32 of the vehicle audio module 3, the image message of tire pressure and tire location is displayed on the screen 31 of the vehicle audio module 3; if it is a tire pressure abnormal message, the tire pressure detection device emits warning sounds to warn users, if tire location is wrong or unknown tire, users may directly press the screen 31 of the vehicle audio module 3 to correct.

The tire pressure detection method of the present invention, wherein in the step A, when pumping up a tire (such as the right front tire) of the vehicle, if there is no report, users may know breakdown of the tire pressure detection module 2, so it can achieve the effect of warning users.

The abovementioned tire pressure detection method of the present invention, wherein in the step D, the vehicle audio module 3 is connected to a vehicle door open detection module 4. When the vehicle door open detection device 4 detects that the vehicle door open status continues over a setup time (such as 5 seconds), the location of the pressure rising tire is automatically changed to the relative location of the open vehicle door. For example, during reporting tire pressure of the left back tire is rising, the right front door opens over the setup time, the left back tire is automatically change to the right front tire and the tire pressure display device starts to report tire pressure of the right front tire is rising.

The abovementioned tire pressure detection method of the present invention, wherein in the step B, the receiver 12 of the main module 1 is connected to a ACC power source 5 for receiving a close signal of the ACC power source 5; and the CPU 11 closes the main module 1 for arriving a setup time after receiving the close signal of the ACC power source 5.

The abovementioned tire pressure detection method of the present invention, wherein in the step B, the receiver 12 of the main module 1 is connected to a ACC power source 5 for receiving a close signal of the ACC power source 5; the CPU 11 closes the main module 1 for arriving a setup time after receiving the close signal of the ACC power source 5; the receiver 12 receives the detection message from the tire pressure detection module 2; the CPU 11 sends a start message; the vehicle audio module 3 is started from the POWER OFF status as receiving the start message; and the display of the screen 31 is switched to the tire pressure display.

The abovementioned tire pressure detection method of the present invention, wherein in the step D, the screen 31 includes a modify key 33. Users may press the modify key 33 on the screen 31 to correct errors, press the wrong tire on the screen 31, and move to the correct tire to switch location of the two tires to correct error. For example, users pump up the right front tire of the vehicle, but the tire pressure detection module 2 reports the right back tire and its tire pressure; users may press the right back tire on the screen 31, and move the right back tire to the right front tire for switching the two tires.

I claim:

1. A tire pressure display device, includes a main module, multiple tire pressure detection modules and a vehicle audio module, wherein:

the multiple tire pressure detection modules, which detect tire pressure and report detection messages of tire pressure and tire location, the detection messages are integer signals of tire pressure and tire location;

the main module, which includes a CPU and a receiver; the receiver is connected to the CPU for receiving the detection messages reported by the multiple tire pressure detection modules; the CPU is connected to the receiver and used to process the received detection messages reported by the multiple detection modules for corresponding outputting;

the vehicle audio module, which is connected to the CPU, is provided to transform the detection messages to generate an image message for displaying via a screen, and transform the detection messages to generate a voice message for broadcasting via at least a speaker;

the tire pressure detection module actively reports tire location and tire pressure during pumping up tires, the vehicle audio module voice broadcasts tire pressure and tire location, user may directly correct errors on the screen of the vehicle audio module if tire location is wrong or unknown tire; if there is no report, users may know the breakdown of the tire pressure detection module for warning.

2. The tire pressure display device as claimed in claim 1, wherein the tire pressure detection module further includes a wireless transmitter, which wirelessly sends the detection messages to the main module, and the receiver is a wireless receiver for receiving detection messages reported by the tire pressure detection modules.

3. The tire pressure display device as claimed in claim 1, wherein the screen of the vehicle audio module includes a modify key, which is provided for pressing to correct errors.

4. The tire pressure display device as claimed in claim 1, wherein the tire pressure detection module further includes a thermal detector for detecting the temperature of tires.

5. The tire pressure display device as claimed in claim 1, wherein the receiver is further connected to an ACC power source for receiving a close signal from the ACC power source, and the CPU closes the main module for arriving a setup time after receiving the close signal of the ACC power source.

6. The tire pressure display device as claimed in claim 1, wherein the vehicle audio module is further connected to a vehicle door open detection device for detecting the vehicle door open status.

7. A tire pressure detection method of using a tire pressure display device to detect and report messages and notify users detection results by image and voice broadcasting; the tire pressure display device includes a main module, multiple tire pressure detection modules and a vehicle audio module, and the detection method of the tire pressure display device includes the following steps:

A. The tire pressure detection module detects tire pressure, and sends the detection message of tire pressure and tire location when detecting tire pressure varying, enter step B;

B. The main module determines the detection message, a receiver receives the detection message of the tire pressure detection module and determines the increasing speed of tire pressure, if the increasing speed of tire pressure is smaller than a setup value, the tire pressure may be increased because of the increasing temperature and the main module does not send the detection message of the tire pressure detection module, enter step A; if the increasing speed of tire pressure is larger than the setup value, the main module sends the detection message of the tire pressure detection module, enter step C;

C. The vehicle audio module transforms the detection message, receives the tire pressure detection message sent by the main module, and transforms the detection message reported by the multiple receivers to generate an image message and a voice message, enter step D;

D. The vehicle audio module broadcasts the detection message, the voice message of tire pressure and tire location is broadcasted via a speaker of the vehicle audio module, the image message of tire pressure and tire location is displayed on a screen of the vehicle audio module; if it is a tire pressure abnormal message, the tire pressure detection device emits warning sounds to warn users, if tire location is wrong or unknown tire, a modify key of the vehicle audio module is provided for directly pressing to modify or input.

8. The tire pressure detection method as claimed in claim 7, wherein in the step A, when pumping up a tire of the vehicle, if there is no report, the breakdown of the tire pressure detection module may be known for warning.

9. The tire pressure detection method as claimed in claim 7, wherein in the step D, the vehicle audio module is connected to a vehicle door open detection module, when the vehicle door open detection device detects that the vehicle door open status continues over a setup time, the location of the pressure rising tire is automatically changed to the relative location of the open vehicle door.

10. The tire pressure detection method as claimed in claim 7, wherein in the step B, the receiver of the main module is connected to a ACC power source for receiving a close signal of the ACC power source; and the CPU closes the main module for arriving a setup time after receiving the close signal of the ACC power source.

11. The tire pressure detection method as claimed in claim 7, wherein in the step B, the receiver of the main module is connected to a ACC power source for receiving a close signal of the ACC power source; the CPU closes the main module for arriving a setup time after receiving the close signal of the ACC power source; the receiver receives the detection message from the tire pressure detection module; the CPU sends a start message; the vehicle audio module is started from the POWER OFF status as receiving the start message and the display of the screen is switched to the tire pressure display.

12. The tire pressure detection method as claimed in claim 7, wherein in the step D, the screen includes the modify key, users may press the modify key directly, then press the wrong tire in the screen, and then move it to the correct tire to switch the location of the two tires for correcting error.

* * * * *